United States Patent
Hamada et al.

(10) Patent No.: US 7,692,563 B2
(45) Date of Patent: Apr. 6, 2010

(54) MULTIPLE DIFFERENTIAL TRANSMISSION SYSTEM INCLUDING SIGNAL TRANSMITTER AND SIGNAL RECEIVER CONNECTED VIA THREE SIGNAL LINES

(75) Inventors: Seiji Hamada, Osaka (JP); Hirotsugu Fusayasu, Kyoto (JP); Shin-ichi Tanimoto, Kyoto (JP); Ryo Matsubara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/160,297

(22) PCT Filed: Apr. 25, 2007

(86) PCT No.: PCT/JP2007/058967

§ 371 (c)(1),
(2), (4) Date: Mar. 27, 2009

(87) PCT Pub. No.: WO2007/125965

PCT Pub. Date: Nov. 8, 2007

(65) Prior Publication Data

US 2009/0195699 A1    Aug. 6, 2009

(30) Foreign Application Priority Data

Apr. 27, 2006   (JP)   ............................ 2006-123173

(51) Int. Cl.
*H03M 5/02* (2006.01)
*H04B 3/28* (2006.01)
(52) U.S. Cl. .......................................... 341/56; 333/12
(58) Field of Classification Search .................. 341/56, 341/155, 106, 76; 439/74; 333/12; 326/86
See application file for complete search history.

(56) References Cited

U.S. PATENT DOCUMENTS 5,166,956 A    11/1992   Baltus et al.

(Continued)

FOREIGN PATENT DOCUMENTS

EP    1 331 776    7/2003

(Continued)

OTHER PUBLICATIONS

International Search Report issued Jun. 12, 2007 in International (PCT) Application No. PCT/JP2007/058967.

*Primary Examiner*—Peguy JeanPierre
(74) *Attorney, Agent, or Firm*—Wenderoth, Lind & Ponack, L.L.P.

(57) ABSTRACT

In a signal transmitter for a multiple differential transmission system including a signal transmitter and a signal receiver connected via three signal lines, first and second differential drivers generate first and second output signals of bipolar four values and having a first signal voltage level, and inverted first and second output signals, responsive to first and second bit information signals. A third differential driver generates a third output signal of bipolar four values having a second signal voltage level, and an inverted third output signal, responsive to a third bit information signal. The first output signal and the inverted third output signal are combined and transmitted to the first signal line, the second output signal and the inverted first output signal are combined and transmitted to the second signal line, and the third output signal and the inverted second output signal are combined and transmitted to the third signal line.

6 Claims, 11 Drawing Sheets

U.S. PATENT DOCUMENTS

| | | |
|---|---|---|
| 6,317,465 B1 | 11/2001 | Akamatsu et al. |
| 6,556,628 B1 | 4/2003 | Poulton et al. |
| 6,891,311 B2 * | 5/2005 | Phelps et al. ................ 310/317 |
| 7,339,443 B2 * | 3/2008 | Fusayasu et al. .............. 333/12 |
| 7,388,449 B2 * | 6/2008 | Hamada et al. ............... 333/12 |
| 7,448,880 B2 * | 11/2008 | Osaka ......................... 439/74 |

FOREIGN PATENT DOCUMENTS

| | | |
|---|---|---|
| JP | 4-230147 | 8/1992 |
| JP | 4-367139 | 12/1992 |
| JP | 6-261092 | 9/1994 |
| JP | 10-233810 | 9/1998 |
| JP | 2001-168927 | 6/2001 |
| JP | 3507687 | 12/2003 |
| JP | 2004-80827 | 3/2004 |
| JP | 2005-333508 | 12/2005 |

* cited by examiner

| B1 | B2 | S11a[V] | S11b[V] |
|---|---|---|---|
| 0 | 0 | −1 | 1 |
| 0 | 1 | 1 | −1 |
| 1 | 0 | −2 | 2 |
| 1 | 1 | 2 | −2 |

*Fig.5*

| B3 | B4 | S12a[V] | S12b[V] |
|---|---|---|---|
| 0 | 0 | −1 | 1 |
| 0 | 1 | 1 | −1 |
| 1 | 0 | −2 | 2 |
| 1 | 1 | 2 | −2 |

*Fig.6*

| B5 | B6 | S13a[V] | S13b[V] |
|---|---|---|---|
| 0 | 0 | −1.1 | 1.1 |
| 0 | 1 | 1.1 | −1.1 |
| 1 | 0 | −2.2 | 2.2 |
| 1 | 1 | 2.2 | −2.2 |

Fig. 7

| B1 | B2 | B3 | B4 | B5 | B6 | V1 | V2 | V3 |
|----|----|----|----|----|----|------|------|------|
| 0 | 0 | 0 | 0 | 0 | 0 | 0.05 | 0.05 | -0.1 |
| 0 | 0 | 0 | 0 | 0 | 1 | -1.05 | -1.05 | 2.1 |
| 0 | 0 | 0 | 0 | 1 | 0 | 0.6 | 0.6 | -1.2 |
| 0 | 0 | 0 | 0 | 1 | 1 | -1.6 | -1.6 | 3.2 |
| 0 | 0 | 0 | 1 | 0 | 0 | -0.95 | 2.05 | -1.1 |
| 0 | 0 | 0 | 1 | 0 | 1 | -2.05 | 0.95 | 1.1 |
| 0 | 0 | 0 | 1 | 1 | 0 | -0.4 | 2.6 | -2.2 |
| 0 | 0 | 0 | 1 | 1 | 1 | -2.6 | 0.4 | 2.2 |
| 0 | 0 | 1 | 0 | 0 | 0 | 0.55 | -0.95 | 0.4 |
| 0 | 0 | 1 | 0 | 0 | 1 | -0.55 | -2.05 | 2.6 |
| 0 | 0 | 1 | 0 | 1 | 0 | 1.1 | -0.4 | -0.7 |
| 0 | 0 | 1 | 0 | 1 | 1 | -1.1 | -2.6 | 3.7 |
| 0 | 0 | 1 | 1 | 0 | 0 | -1.45 | 3.05 | -1.6 |
| 0 | 0 | 1 | 1 | 0 | 1 | -2.55 | 1.95 | 0.6 |
| 0 | 0 | 1 | 1 | 1 | 0 | -0.9 | 3.6 | -2.7 |
| 0 | 0 | 1 | 1 | 1 | 1 | -3.1 | 1.4 | 1.7 |
| 0 | 1 | 0 | 0 | 0 | 0 | 2.05 | -0.95 | -1.1 |
| 0 | 1 | 0 | 0 | 0 | 1 | 0.95 | -2.05 | 1.1 |
| 0 | 1 | 0 | 0 | 1 | 0 | 2.6 | -0.4 | -2.2 |
| 0 | 1 | 0 | 0 | 1 | 1 | 0.4 | -2.6 | 2.2 |
| 0 | 1 | 0 | 1 | 0 | 0 | 1.05 | 1.05 | -2.1 |
| 0 | 1 | 0 | 1 | 0 | 1 | -0.05 | -0.05 | 0.1 |
| 0 | 1 | 0 | 1 | 1 | 0 | 1.6 | 1.6 | -3.2 |
| 0 | 1 | 0 | 1 | 1 | 1 | -0.6 | -0.6 | 1.2 |
| 0 | 1 | 1 | 0 | 0 | 0 | 2.55 | -1.95 | -0.6 |
| 0 | 1 | 1 | 0 | 0 | 1 | 1.45 | -3.05 | 1.6 |
| 0 | 1 | 1 | 0 | 1 | 0 | 3.1 | -1.4 | -1.7 |
| 0 | 1 | 1 | 0 | 1 | 1 | 0.9 | -3.6 | 2.7 |
| 0 | 1 | 1 | 1 | 0 | 0 | 0.55 | 2.05 | -2.6 |
| 0 | 1 | 1 | 1 | 0 | 1 | -0.55 | 0.95 | -0.4 |
| 0 | 1 | 1 | 1 | 1 | 0 | 1.1 | 2.6 | -3.7 |
| 0 | 1 | 1 | 1 | 1 | 1 | -1.1 | 0.4 | 0.7 |

Fig. 8

| B1 | B2 | B3 | B4 | B5 | B6 | V1 | V2 | V3 |
|----|----|----|----|----|----|------|------|------|
| 1 | 0 | 0 | 0 | 0 | 0 | −0.95 | 0.55 | 0.4 |
| 1 | 0 | 0 | 0 | 0 | 1 | −2.05 | −0.55 | 2.6 |
| 1 | 0 | 0 | 0 | 1 | 0 | −0.4 | 1.1 | −0.7 |
| 1 | 0 | 0 | 0 | 1 | 1 | −2.6 | −1.1 | 3.7 |
| 1 | 0 | 0 | 1 | 0 | 0 | −1.95 | 2.55 | −0.6 |
| 1 | 0 | 0 | 1 | 0 | 1 | −3.05 | 1.45 | 1.6 |
| 1 | 0 | 0 | 1 | 1 | 0 | −1.4 | 3.1 | −1.7 |
| 1 | 0 | 0 | 1 | 1 | 1 | −3.6 | 0.9 | 2.7 |
| 1 | 0 | 1 | 0 | 0 | 0 | −0.45 | −0.45 | 0.9 |
| 1 | 0 | 1 | 0 | 0 | 1 | −1.55 | −1.55 | 3.1 |
| 1 | 0 | 1 | 0 | 1 | 0 | 0.1 | 0.1 | −0.2 |
| 1 | 0 | 1 | 0 | 1 | 1 | −2.1 | −2.1 | 4.2 |
| 1 | 0 | 1 | 1 | 0 | 0 | −2.45 | 3.55 | −1.1 |
| 1 | 0 | 1 | 1 | 0 | 1 | −3.55 | 2.45 | 1.1 |
| 1 | 0 | 1 | 1 | 1 | 0 | −1.9 | 4.1 | −2.2 |
| 1 | 0 | 1 | 1 | 1 | 1 | −4.1 | 1.9 | 2.2 |
| 1 | 1 | 0 | 0 | 0 | 0 | 3.05 | −1.45 | −1.6 |
| 1 | 1 | 0 | 0 | 0 | 1 | 1.95 | −2.55 | 0.6 |
| 1 | 1 | 0 | 0 | 1 | 0 | 3.6 | −0.9 | −2.7 |
| 1 | 1 | 0 | 0 | 1 | 1 | 1.4 | −3.1 | 1.7 |
| 1 | 1 | 0 | 1 | 0 | 0 | 2.05 | 0.55 | −2.6 |
| 1 | 1 | 0 | 1 | 0 | 1 | 0.95 | −0.55 | −0.4 |
| 1 | 1 | 0 | 1 | 1 | 0 | 2.6 | 1.1 | −3.7 |
| 1 | 1 | 0 | 1 | 1 | 1 | 0.4 | −1.1 | 0.7 |
| 1 | 1 | 1 | 0 | 0 | 0 | 3.55 | −2.45 | −1.1 |
| 1 | 1 | 1 | 0 | 0 | 1 | 2.45 | −3.55 | 1.1 |
| 1 | 1 | 1 | 0 | 1 | 0 | 4.1 | −1.9 | −2.2 |
| 1 | 1 | 1 | 0 | 1 | 1 | 1.9 | −4.1 | 2.2 |
| 1 | 1 | 1 | 1 | 0 | 0 | 1.55 | 1.55 | −3.1 |
| 1 | 1 | 1 | 1 | 0 | 1 | 0.45 | 0.45 | −0.9 |
| 1 | 1 | 1 | 1 | 1 | 0 | 2.1 | 2.1 | −4.2 |
| 1 | 1 | 1 | 1 | 1 | 1 | −0.1 | −0.1 | 0.2 |

| B1 | B2 | B3 | B4 | B5 | B6 | V1 | V2 | V3 |
|---|---|---|---|---|---|---|---|---|
| 0 | 0 | 0 | 0 | 0 | 0 | 0.075 | 0.075 | −0.15 |
| 0 | 0 | 0 | 0 | 0 | 1 | −1.025 | −1.025 | 2.05 |
| 0 | 0 | 0 | 0 | 1 | 0 | −0.475 | −0.475 | 0.95 |
| 0 | 0 | 0 | 0 | 1 | 1 | −1.575 | −1.575 | 3.15 |
| 0 | 0 | 0 | 1 | 0 | 0 | −0.925 | 2.075 | −1.15 |
| 0 | 0 | 0 | 1 | 0 | 1 | −2.025 | 0.975 | 1.05 |
| 0 | 0 | 0 | 1 | 1 | 0 | −1.475 | 1.525 | −0.05 |
| 0 | 0 | 0 | 1 | 1 | 1 | −2.575 | 0.425 | 2.15 |
| 0 | 0 | 1 | 0 | 0 | 0 | −0.425 | 1.075 | −0.65 |
| 0 | 0 | 1 | 0 | 0 | 1 | −1.525 | −0.025 | 1.55 |
| 0 | 0 | 1 | 0 | 1 | 0 | −0.975 | 0.525 | 0.45 |
| 0 | 0 | 1 | 0 | 1 | 1 | −2.075 | −0.575 | 2.65 |
| 0 | 0 | 1 | 1 | 0 | 0 | −1.425 | 3.075 | −1.65 |
| 0 | 0 | 1 | 1 | 0 | 1 | −2.525 | 1.975 | 0.55 |
| 0 | 0 | 1 | 1 | 1 | 0 | −1.975 | 2.525 | −0.55 |
| 0 | 0 | 1 | 1 | 1 | 1 | −3.075 | 1.425 | 1.65 |
| 0 | 1 | 0 | 0 | 0 | 0 | 2.05 | −0.95 | −1.1 |
| 0 | 1 | 0 | 0 | 0 | 1 | 0.975 | −2.025 | 1.05 |
| 0 | 1 | 0 | 0 | 1 | 0 | 1.525 | −1.475 | −0.05 |
| 0 | 1 | 0 | 0 | 1 | 1 | 0.425 | −2.575 | 2.15 |
| 0 | 1 | 0 | 1 | 0 | 0 | 1.075 | 1.075 | −2.15 |
| 0 | 1 | 0 | 1 | 0 | 1 | −0.025 | −0.025 | 0.05 |
| 0 | 1 | 0 | 1 | 1 | 0 | 0.525 | 0.525 | −1.05 |
| 0 | 1 | 0 | 1 | 1 | 1 | −0.575 | −0.575 | 1.15 |
| 0 | 1 | 1 | 0 | 0 | 0 | 1.575 | 0.075 | −1.65 |
| 0 | 1 | 1 | 0 | 0 | 1 | 0.475 | −1.025 | 0.55 |
| 0 | 1 | 1 | 0 | 1 | 0 | 1.025 | −0.475 | −0.55 |
| 0 | 1 | 1 | 0 | 1 | 1 | −0.075 | −1.575 | 1.65 |
| 0 | 1 | 1 | 1 | 0 | 0 | 0.575 | 2.075 | −2.65 |
| 0 | 1 | 1 | 1 | 0 | 1 | −0.525 | 0.975 | −0.45 |
| 0 | 1 | 1 | 1 | 1 | 0 | 0.025 | 1.525 | −1.55 |
| 0 | 1 | 1 | 1 | 1 | 1 | −1.075 | 0.425 | 0.65 |

Fig. 13

| B1 | B2 | B3 | B4 | B5 | B6 | V1 | V2 | V3 |
|---|---|---|---|---|---|---|---|---|
| 1 | 0 | 0 | 0 | 0 | 0 | 1.075 | -0.425 | -0.65 |
| 1 | 0 | 0 | 0 | 0 | 1 | -0.025 | -1.525 | 1.55 |
| 1 | 0 | 0 | 0 | 1 | 0 | 0.525 | -0.975 | 0.45 |
| 1 | 0 | 0 | 0 | 1 | 1 | -0.575 | -2.075 | 2.65 |
| 1 | 0 | 0 | 1 | 0 | 0 | 0.075 | 1.575 | -1.65 |
| 1 | 0 | 0 | 1 | 0 | 1 | -1.025 | 0.475 | 0.55 |
| 1 | 0 | 0 | 1 | 1 | 0 | -0.475 | 1.025 | -0.55 |
| 1 | 0 | 0 | 1 | 1 | 1 | -1.575 | -0.075 | 1.65 |
| 1 | 0 | 1 | 0 | 0 | 0 | 0.575 | 0.575 | -1.15 |
| 1 | 0 | 1 | 0 | 0 | 1 | -0.525 | -0.525 | 1.05 |
| 1 | 0 | 1 | 0 | 1 | 0 | 0.025 | 0.025 | -0.05 |
| 1 | 0 | 1 | 0 | 1 | 1 | -1.075 | -1.075 | 2.15 |
| 1 | 0 | 1 | 1 | 0 | 0 | -0.425 | 2.575 | -2.15 |
| 1 | 0 | 1 | 1 | 0 | 1 | -1.525 | 1.475 | 0.05 |
| 1 | 0 | 1 | 1 | 1 | 0 | -0.975 | 2.025 | -1.05 |
| 1 | 0 | 1 | 1 | 1 | 1 | -2.075 | 0.925 | 1.15 |
| 1 | 1 | 0 | 0 | 0 | 0 | 3.075 | -1.425 | -1.65 |
| 1 | 1 | 0 | 0 | 0 | 1 | 1.975 | -2.525 | 0.55 |
| 1 | 1 | 0 | 0 | 1 | 0 | 2.525 | -1.975 | -0.55 |
| 1 | 1 | 0 | 0 | 1 | 1 | 1.425 | -3.075 | 1.65 |
| 1 | 1 | 0 | 1 | 0 | 0 | 2.075 | 0.575 | -2.65 |
| 1 | 1 | 0 | 1 | 0 | 1 | 0.975 | -0.525 | -0.45 |
| 1 | 1 | 0 | 1 | 1 | 0 | 1.525 | 0.025 | -1.55 |
| 1 | 1 | 0 | 1 | 1 | 1 | 0.425 | -1.075 | 0.65 |
| 1 | 1 | 1 | 0 | 0 | 0 | 2.575 | -0.425 | -2.15 |
| 1 | 1 | 1 | 0 | 0 | 1 | 1.475 | -1.525 | 0.05 |
| 1 | 1 | 1 | 0 | 1 | 0 | 2.025 | -0.975 | -1.05 |
| 1 | 1 | 1 | 0 | 1 | 1 | 0.925 | -2.075 | 1.15 |
| 1 | 1 | 1 | 1 | 0 | 0 | 1.575 | 1.575 | -3.15 |
| 1 | 1 | 1 | 1 | 0 | 1 | 0.475 | 0.475 | -0.95 |
| 1 | 1 | 1 | 1 | 1 | 0 | 1.025 | 1.025 | -2.05 |
| 1 | 1 | 1 | 1 | 1 | 1 | -0.075 | -0.075 | 0.15 |

MULTIPLE DIFFERENTIAL TRANSMISSION SYSTEM INCLUDING SIGNAL TRANSMITTER AND SIGNAL RECEIVER CONNECTED VIA THREE SIGNAL LINES

TECHNICAL FIELD

The present invention relates to a multiple differential transmission system for transmitting bit information signals of a plurality of bits via a signal transmission path including a small number of signal lines.

BACKGROUND ART

In recent years, a signal rate for transferring image information has been accelerated as a quality of a flat panel display typified by a liquid crystal television set or a plasma television set is improved from VGA (Video Graphics Array) to XGA (eXtended Graphics Array). Accordingly, a small-amplitude differential transmission apparatus has been used as an apparatus for transmitting digital data at a high rate.

This is a transmission apparatus for transmitting signals with inverted phases from each other through one balanced cable or two wiring patterns formed on a printed circuit board. The transmission apparatus is characterized by low noise, high resistance against external noise, low voltage amplitude, high data transmission rate, and the like. The transmission apparatus has been increasingly introduced, in particular in the field of display to transmit data at high transmission rate.

Patent Document 1: Japanese Patent No. 3507687; and

Patent Document 2: Japanese Patent Laid-open Publication No. 1992-230147.

DISCLOSURE OF THE INVENTION

Problems to be Solved

The differential transmission apparatus has many advantages, as mentioned above, in high rate transmission over an ordinary single-end transmission apparatus. However, two signal lines are required to transmit one-bit data. Due to this, the differential transmission apparatus has problems of an increase in the number of signal lines, an increase in a wiring region for signal lines on the printed circuit board, and the like so as to realize multiple-bit data transmission. These problems should be overcome to realize higher rate transmission in the future.

As regards the problems, in a data transmission system disclosed in the Patent Document 1, two-bit data transmission is realized by three signal lines with one signal line used as a complementary data line out of the three signal lines (while four signal lines are necessary for a differential transmission apparatus according to a prior art). The differential data transmission apparatus disclosed in the Patent Document 1, and this leads to decrease in the number of signal lines. However, the differential data transmission apparatus disclosed in the Patent Document 1 has such problems as larger radiation noise than that generated in the ordinary differential transmission because the balance is not kept among signals transmitted via the three data signal lines.

Furthermore, the Patent Document 2 discloses differential transmission of bit information signals of three bits using three signal lines. However, the technique disclosed in the Patent Document 2 has such a restriction that it is necessary to make output signals from three differential drivers all different. All of the three bits in states of 0 and 1 cannot be transmitted. Only the six states can be transmitted by excluding the two states in which all the bits are 0 or 1 from the three bits (eight states). As a result, the technique disclosed in the Patent Document 2 is confronted with great problems before being put to practical use.

It is an object of the present invention to provide a multiple differential transmission system capable of realizing differential transmission of bit information signals of six bits using three signal lines, and a signal transmitter and a signal receiver for use in the multiple differential transmission system so as to overcome the above-mentioned problems and to be able to suppress the occurrence of noise and to further decrease the number of signal lines.

Means for Dissolving the Problems

According to a first aspect of the present invention, there is provided a signal transmitter for use in a multiple differential transmission system comprising the signal transmitter, a signal receiver, and a signal transmission path including first, second, and third signal lines. The signal transmission path connects the signal transmitter to the signal receiver. The signal transmitter includes first, second and third differential drivers. The first differential driver generates a first output signal of bipolar four values having a predetermined first signal voltage level, and an inverted first output signal that is a phase-inverted signal from the first output signal, in response to a first bit information signal of two bits. The second differential driver generates a second output signal of bipolar four values having the first signal voltage level, and an inverted second output signal that is a phase-inverted signal from the second output signal, in response to a second bit information signal of two bits. The third differential driver generates a third output signal of bipolar four values having a second signal voltage level different from the first signal voltage level, and an inverted third output signal that is a phase-inverted signal from the third output signal, in response to a third bit information signal of two bits. The first output signal and the inverted third output signal are combined and transmitted to the first signal line, the second output signal and the inverted first output signal are combined and transmitted to the second signal line, and the third output signal and the inverted second output signal are combined and transmitted to the third signal line.

According to a second aspect of the present invention, there is provided a signal receiver for receiving three output signals from the signal transmitter via a signal transmission path including first, second, and third signal lines. The signal receiver includes first, second and third terminating resistances, and decoding processing means. The first terminating resistance is connected between the first signal line and the second signal line, the second terminating resistance is connected between the second signal line and the third signal line, and the third terminating resistance is connected between the third signal line and the first signal line. The decoding processing means decodes the first, second, and third bit information signals, and outputting the decoded first, second, and third bit information signals based on a first terminal voltage induced by the first terminating resistance, a second terminal voltage induced by the second terminating resistance, and a third terminal voltage induced by the third terminating resistance.

According to a third aspect of the present invention, there is provided a multiple differential transmission system includes the signal transmitter according to the first aspect of the present invention, and the signal receiver according to the second aspect of the present invention.

According to a fourth aspect of the present invention, there is provided a signal transmitter for use in a multiple differential transmission system including the signal transmitter, a signal receiver, and a signal transmission path including first, second, and third signal lines. The signal transmission path connects the signal transmitter to the signal receiver. The signal transmitter includes first, second, third, fourth, fifth and sixth differential drivers. The first differential driver generates a first output signal of two bipolar values having a predetermined first signal voltage level, and an inverted first output signal that is a phase-inverted signal from the first output signal, in response to a first bit information signal of one bit. The second differential driver generates a second output signal of two bipolar values having a predetermined second signal voltage level different from the first signal voltage level by a first differential voltage, and an inverted second output signal that is an inverted signal from the second output signal, in response to a second bit information signal of one bit. The third differential driver generates a third output signal of two bipolar values having the first signal voltage level, and an inverted third output signal that is a phase-inverted signal from the third output signal, in response to a third bit information signal of one bit. The fourth differential driver generates a fourth output signal of two bipolar values having the second signal voltage level, and an inverted fourth output signal that is a phase-inverted signal from the fourth output signal, in response to a fourth bit information signal of one bit. The fifth differential driver generates a fifth output signal of two bipolar values having a predetermined third signal voltage level different from the first signal voltage levels by a second differential voltage lower than the first differential voltage, and an inverted fifth output signal that is a phase-inverted signal from the fifth output signal, in response to a fifth bit information signal of one bit. The sixth differential driver generates a sixth output signal of two bipolar values having a predetermined fourth signal voltage level different from the second signal voltage levels by a third differential voltage lower than the first differentia voltage and higher than the second differential voltage, and an inverted sixth output signal that is a phase-inverted signal from the sixth output signal, in response to a sixth bit information signal of one bit. The first output signal, the second output signal, the inverted fifth output signal, and the inverted sixth output signal are combined and transmitted to the first signal line. The inverted first output signal, the inverted second output signal, the third output signal, and the fourth output signal are combined and transmitted to the second signal line. The inverted third output signal, the inverted fourth output signal, the fifth output signal, and the sixth output signal are combined and transmitted to the third signal line.

According to a fifth aspect of the present invention, there is provided a signal receiver for receiving three output signals from the signal transmitter via a signal transmission path including first, second, and third signal lines. The signal receiver includes first, second and third terminating resistances, and decoding processing means. The first terminating resistance is connected between the first signal line and the second signal line, the second terminating resistance is connected between the second signal line and the third signal line, and the third terminating resistance connected between the third signal line and the first signal line. The decoding processing means decodes the first to sixth bit information signals and outputting the decoded first to sixth bit information signals based on a first terminal voltage induced by the first terminating resistance, a second terminal voltage induced by the second terminating resistance, and a third terminal voltage induced by the third terminating resistance.

According to a fifth aspect of the present invention, there is provided a multiple differential transmission system including the signal transmitter according to the fourth aspect of the present invention, and the signal receiver according to the fifth aspect of the present invention.

Effects of the Invention

The multiple differential transmission system according to the present invention can differentially transmit bit information signals of six bits using three signal lines, and differentially transmit bit information signals of multiple bits using wirings fewer than those used in the prior arts in a state of suppressing increase of noise.

DESCRIPTION OF REFERENCE SYMBOLS 10, and 10A . . . Signal transmitter;
11, 12, 13, 14, 15, 16, 11A, 12A, 13A, 14A, 15A, and 16A . . . Differential driver;
20, and 20A . . . Signal receiver;
21, 22, 23 . . . A/D converter;
24 . . . Clock reproduction circuit;
25 . . . Decoding processor;
25a, and 25b . . . Table memory;
30 . . . Signal transmission path;
31, 32, and 33 . . . Signal line; and
41, 42, and 43 . . . Terminating resistance.

BEST MODE FOR CARRYING OUT THE INVENTION

Embodiments of the present invention will be described hereinafter with reference to the drawings. In the respective embodiments, like constituent elements are denoted by the same reference symbols, respectively.

First Embodiment

Figure 1:
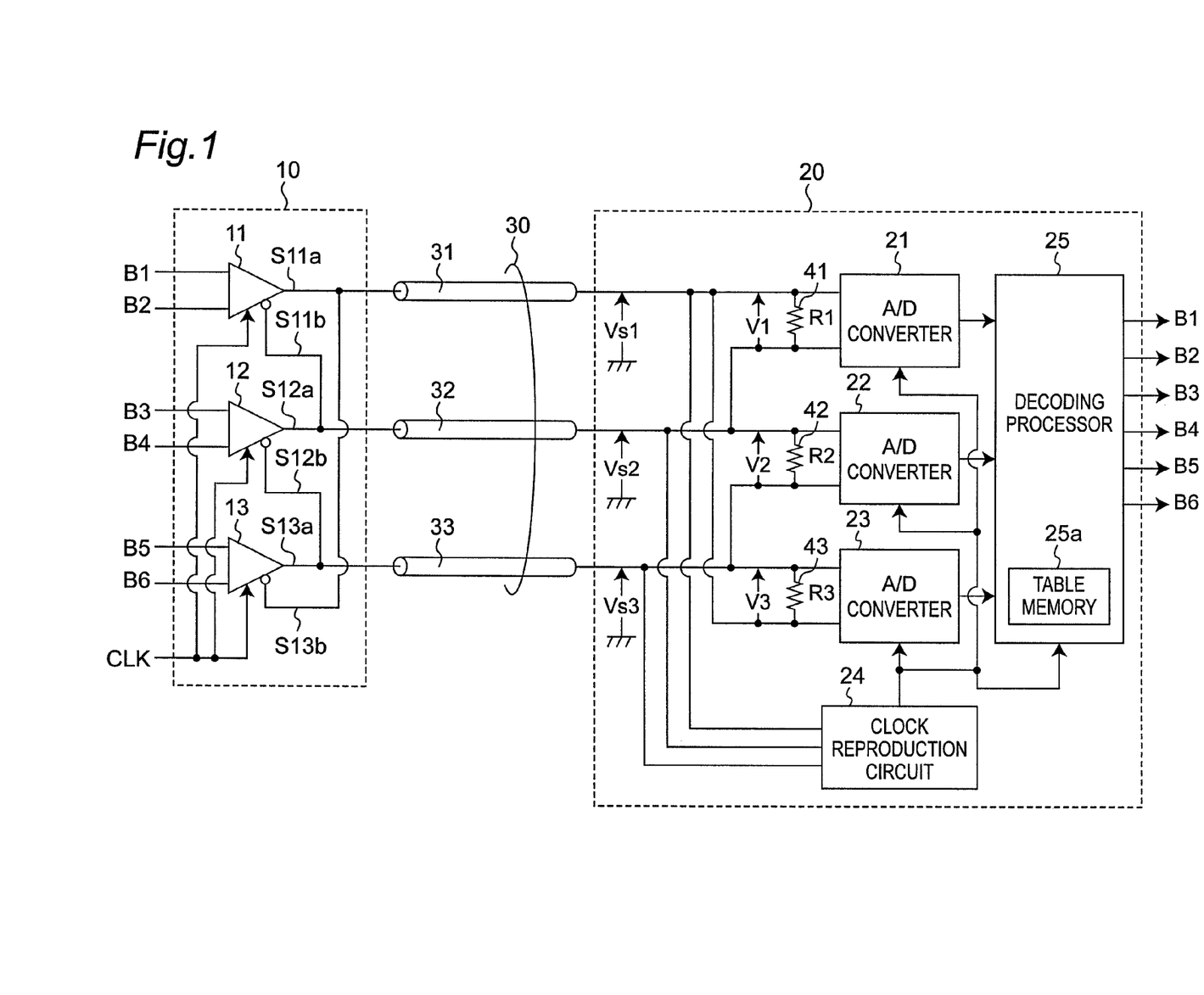
FIG. 1 is a block diagram showing a configuration of a differential transmission system according to a first embodiment of the present invention.

FIG. 1 is a block diagram showing a configuration of a multiple differential transmission system according to a first embodiment of the present invention. Referring to FIG. 1, the multiple differential transmission system is configured to include a signal transmitter 10, a signal receiver 20, and a signal transmission path 30 connecting the signal transmitter 10 to the signal receiver 20 and including three signal lines 31, 32, and 33.

Figure 2:
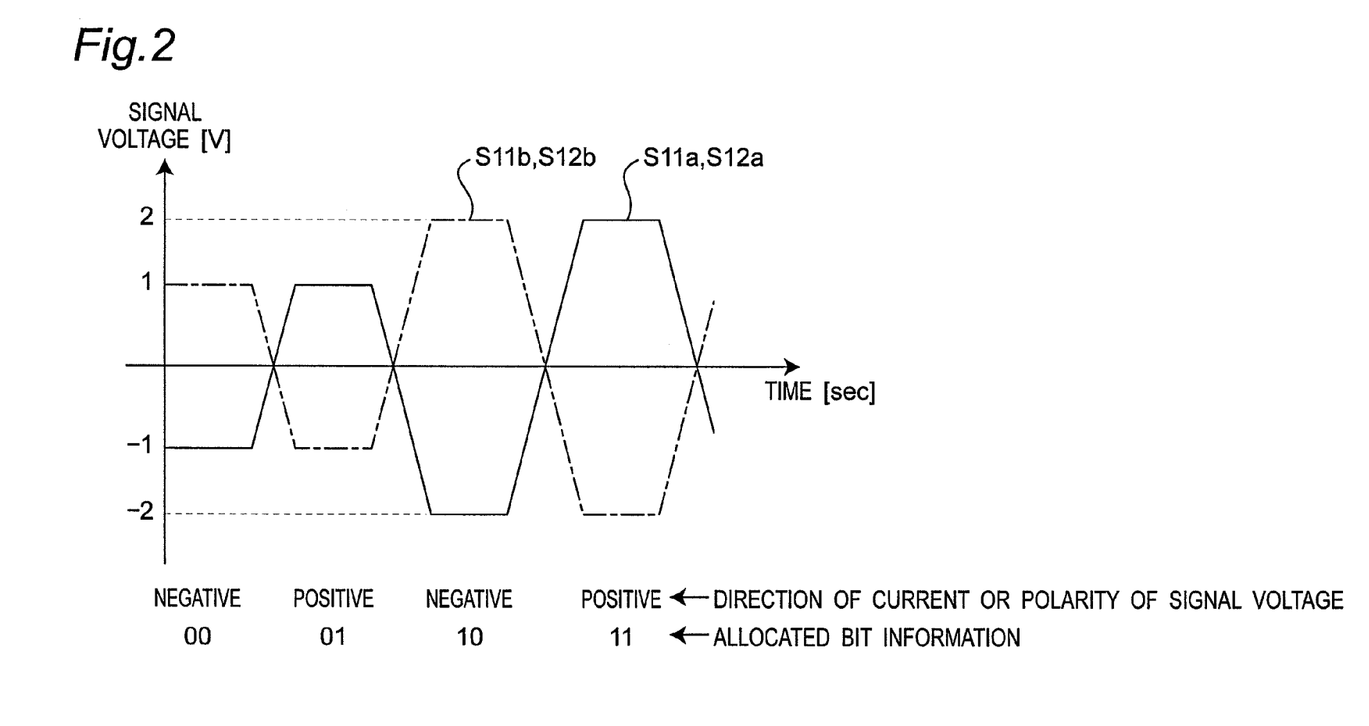
FIG. 2 is a waveform view showing a relationship among signal waveforms of output signals S11$a$ and S11$b$, and S12$a$ and S12$b$ from differential drivers 11 and 12 shown in FIG. 1, respectively, definition of direction of current or polarity of voltage, and allocated bit information.
Figure 3:
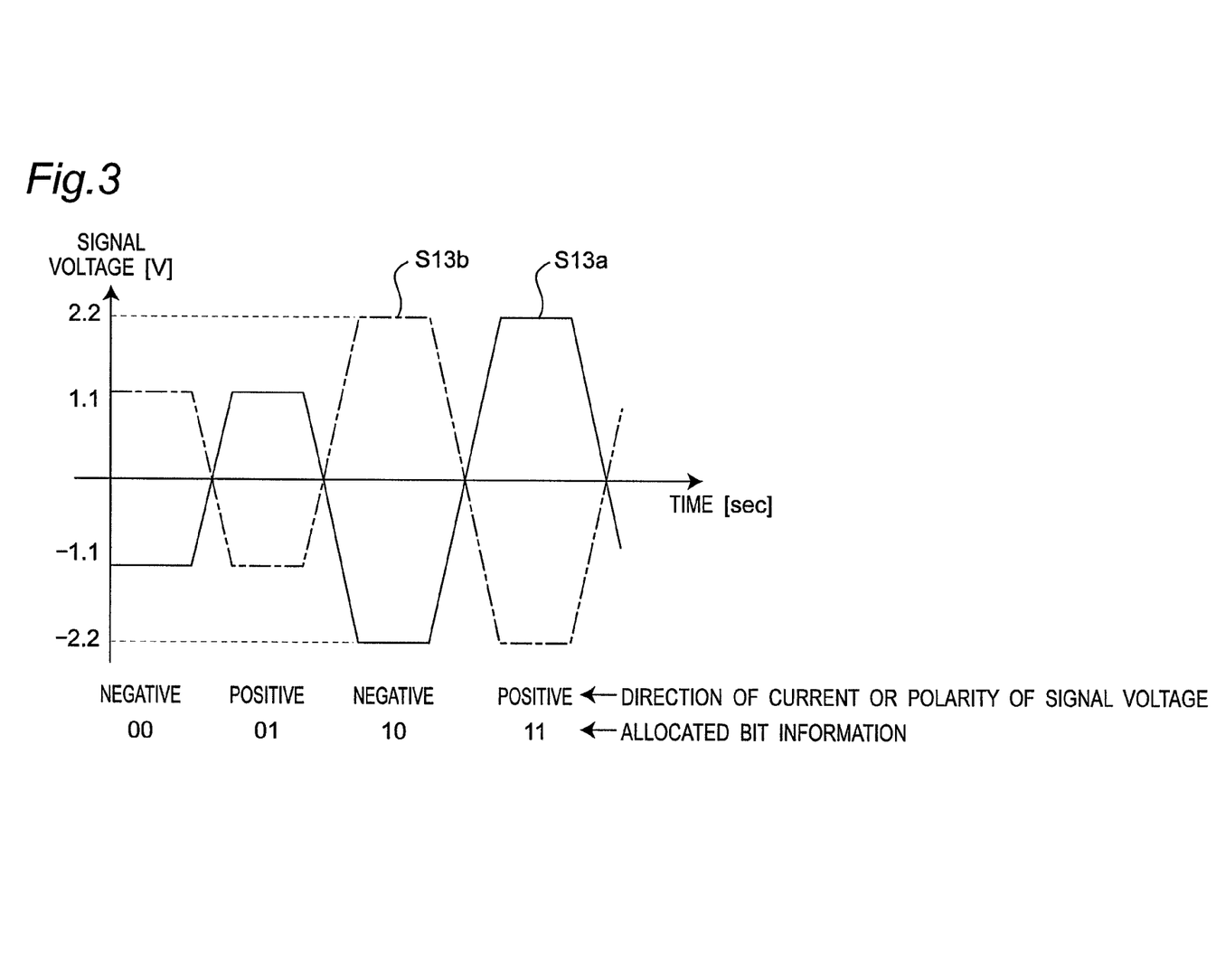
FIG. 3 is a waveform view showing a relationship among signal waveforms of output signals S13$a$ and S13$b$ from a differential driver 13 shown in FIG. 1, definition of direction of current or polarity of voltage, and allocated bit information.
Figure 4:
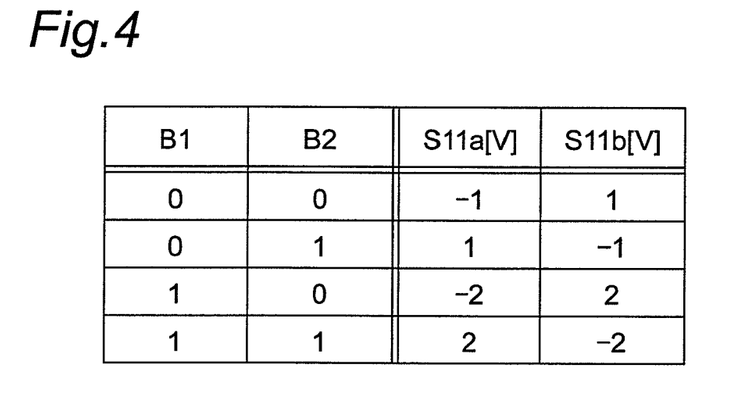
FIG. 4 is a diagram showing a relationship between bit information signals B1 and B2 inputted to the differential driver 13 shown in FIG. 1 and the output signals S11$a$ and S11$b$ from the differential driver 13.
Figure 5:
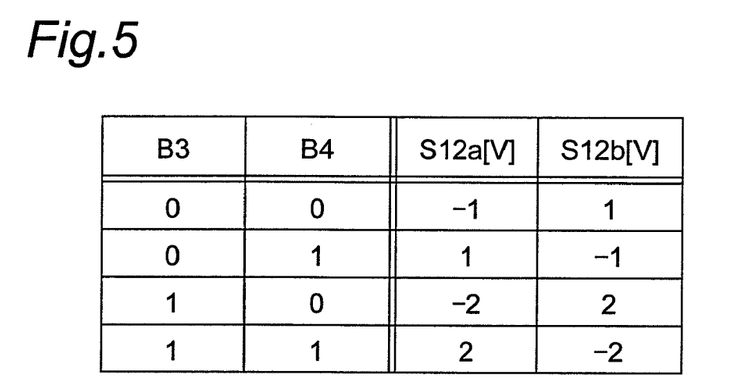
FIG. 5 is a diagram showing a relationship between bit information signals B3 and B4 inputted to the differential driver 14 shown in FIG. 1 and the output signals S12$a$ and S12$b$ from the differential driver 14.
Figure 6:
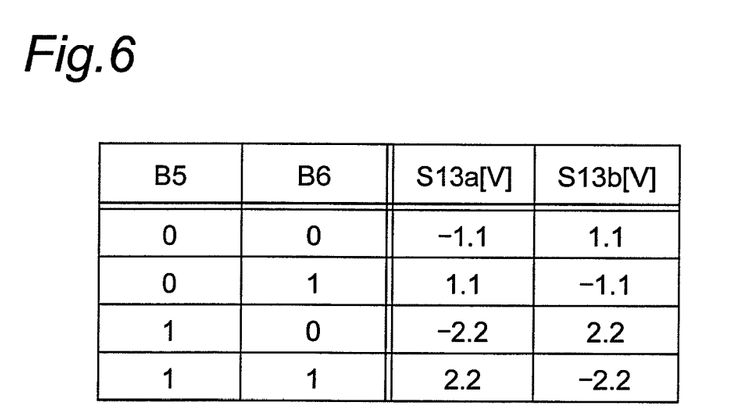
FIG. 6 is a diagram showing a relationship between bit information signals B5 and B6 inputted to the differential driver 15 shown in FIG. 1 and the output signals S13$a$ and S13$b$ from the differential driver 15.

FIG. 2 is a waveform view showing a relationship among signal waveforms of output signals S11a and S11b, and S12a and S12b from differential drivers 11 and 12 shown in FIG. 1, respectively, the definition of the direction of current or the polarity of voltage, and allocated bit information. FIG. 3 is a waveform view showing a relationship among signal waveforms of output signals S13a and S13b from a differential driver 13 shown in FIG. 1, the definition of the direction of current or the polarity of voltage, and allocated bit information. FIG. 4 is a diagram showing a relationship between bit information signals B1 and B2 inputted to the differential driver 13 shown in FIG. 1 and the output signals S11a and S11b from the differential driver 13. FIG. 5 is a diagram showing a relationship between bit information signals B3 and B4 inputted to the differential driver 14 shown in FIG. 1 and the output signals S12a and S12b from the differential driver 14. FIG. 6 is a diagram showing a relationship between bit information signals B5 and B6 inputted to the differential driver 15 shown in FIG. 1 and the output signals S13a and S13b from the differential driver 15.

Referring to FIG. 1, the signal transmitter 10 is configured to include the following:

(a) a differential driver 11 for generating an output signal S11a of bipolar four values having a signal voltage level, e.g., +2V, +1V, −1V, or −2V, as shown in FIGS. 2 and 4, and an inverted output signal S11b that is a phase-inverted signal from the output signal S11a, in response to parallel bit information signals B1 and B2 of two bits;

(b) a differential driver 12 for generating an output signal S12a of bipolar four values having a signal voltage level similar to that of the output signal S11a from the differential driver 11 as shown in FIGS. 2 and 5, and an inverted output signal S12b that is a phase-inverted signal from the output signal S12a, in response to parallel bit information signals B3 and B4 of two bits; and (c) a differential driver 13 for generating an output signal S13a of bipolar four values having a signal voltage level slightly different from those of the output signals 11a and 12a from the differential drivers 11 and 12, e.g., +2.2 V, +1.1 V, −1.1 V, or −2.2 V as shown in FIGS. 3 and 6, and an inverted output signal S13b that is a phase-inverted signal from the output signal S13a, in response to parallel bit information signals B5 and B6 of two bits.

The output signal S11a and the inverted output signal S13b are combined and then transmitted to the signal receiver 20 via the signal line 31, the output signal S12a and the inverted output signal S11b are combined and then transmitted to the signal receiver 20 via the signal line 32, and the output signal S13a and the inverted output signal S12b are combined and then transmitted to the signal receiver 20 via the signal line 33. In this case, the respective differential drivers 11, 12, and 13 output the output signals S11a to S16a and the inverted output signals S11b to S16b therefrom in synchronous with a clock synchronizing with the input bit information signals B1 to B6.

The signal receiver 20 is configured to include three A/D converters 21, 22, and 23, a clock reproduction circuit 24, a decoding processor 25 including a table memory 25a and constituted by, for example, a CPU or a DSP, and three terminating resistances 41, 42, and 43. It is assumed that signal receiver 20-side voltages of the respective signal lines 31, 32, and 33 are Vs1, Vs2, and Vs3. Further, the terminating resistance 41 having a resistance value of R1 is connected between the signal lines 31 and 32, the terminating resistance 42 having a resistance value of R2 is connected between the signal lines 32 and 33, and the terminating resistance 43 having a resistance value of R3 is connected between the signal lines 33 and 31. A terminal voltage V1 induced by the terminating resistance 41 is converted into a digital signal by the A/D converter 21 and the digital signal is outputted to the decoding processor 25. A terminal voltage V2 induced by the terminating resistance 42 is converted into a digital signal by the A/D converter 22, and the digital signal is outputted to the decoding processor 25. A terminal voltage V3 induced by the terminating resistance 43 is converted into a digital signal by the A/D converter 23, and the digital signal is outputted to the decoding processor 25. The clock reproduction circuit 24 is configured to include, for example, a rising edge detection circuit and a PLL circuit. The clock reproduction circuit 24 detects leading edges of the respective signals transmitted via the signal lines 31, 32, and 33, generates a clock at a predetermined frequency synchronously with the detection result, and outputs the clock to the A/D converters 21, 22, and 23 and the decoding processor 25.

Figure 7:
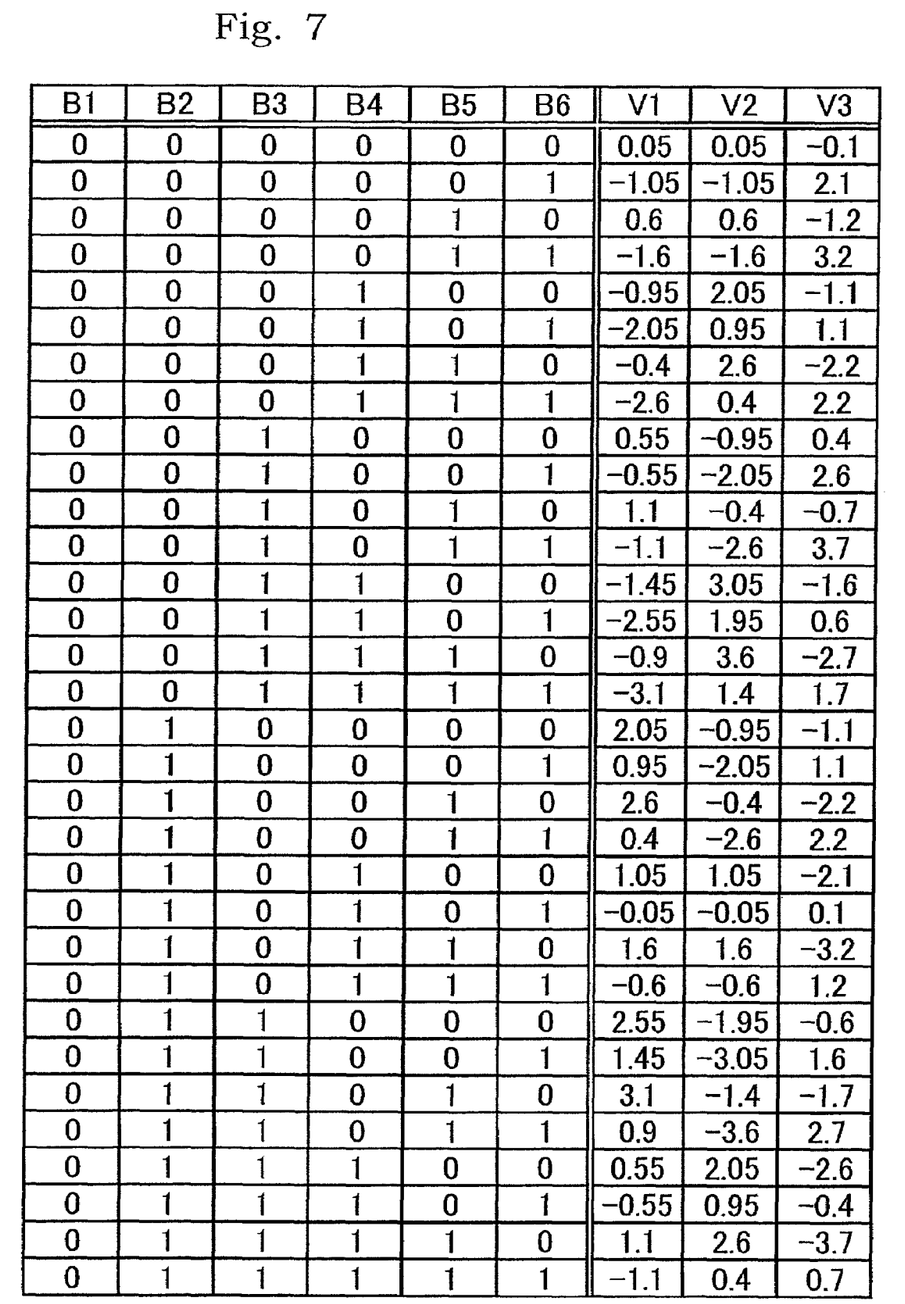
FIG. 7 is a diagram showing a first part of a relationship between bit information signals B1 to B6 transmitted in the multiple differential transmission system shown in FIG. 1 and terminal voltages V1, V2, and V3 induced by respective terminating resistances 41, 42, and 43 of a signal receiver 20.
Figure 8:
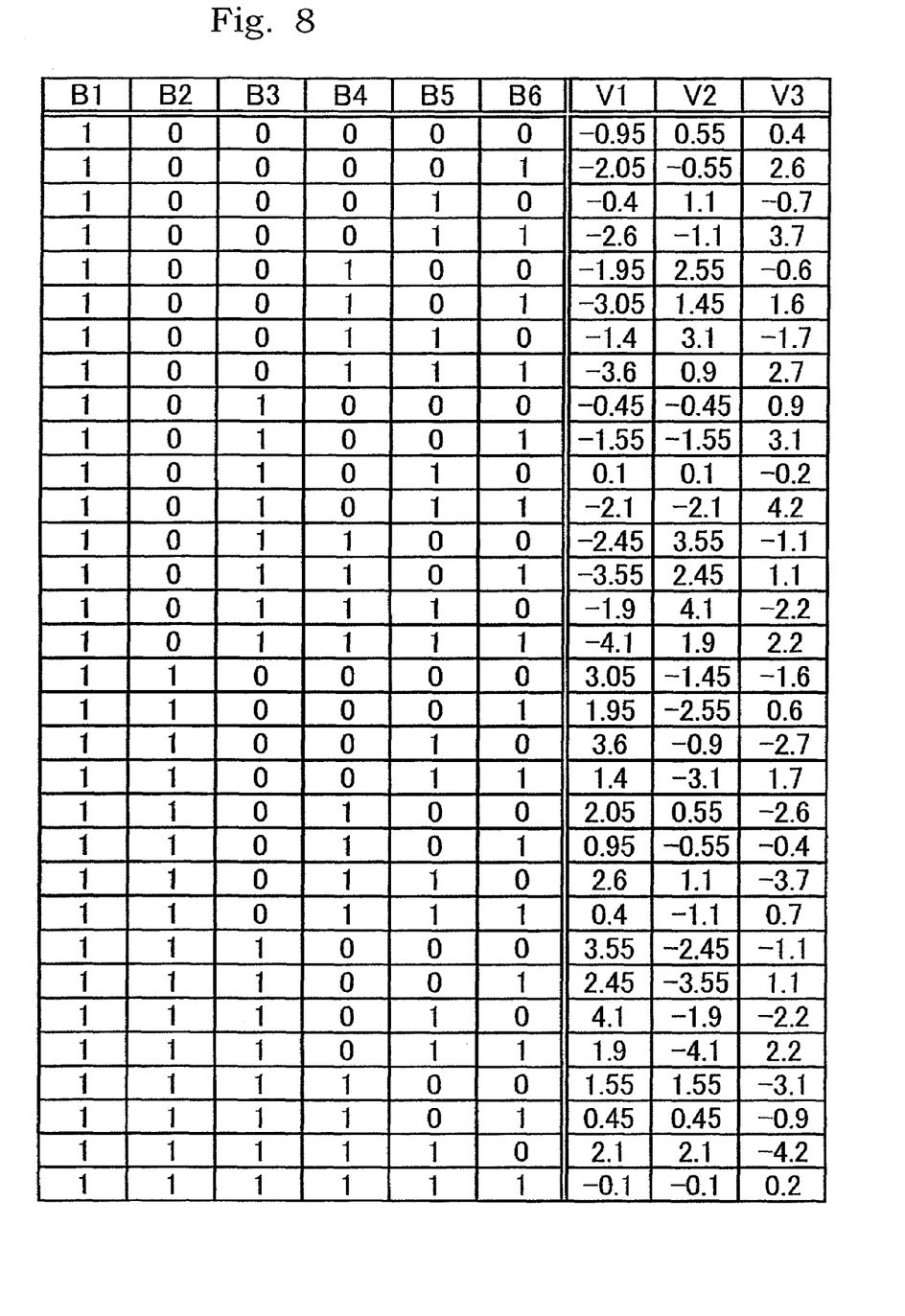
FIG. 8 is a diagram showing a second part of the relationship between the bit information signals B1 to B6 transmitted in the multiple differential transmission system shown in FIG. 1 and the terminal voltages V1, V2, and V3 induced by respective terminating resistances 41, 42, and 43 of a signal receiver 20.

FIGS. 7 and 8 are diagrams showing a relationship between the bit information signals B1 to B6 transmitted in the multiple differential transmission system shown in FIG. 1 and the terminal voltages V1, V2, and V3 induced by the respective terminating resistances 41, 42, and 43 of the signal receiver 20. The decoding processor 25 includes the table memory 25a for storing therein an information table shown in FIGS. 7 and 8 in advance. Referring to the table stored in the table memory 25a, the decoding processor 25 determines the bit information signals B1 to B6 of six bits based on the terminal voltages V1, V2, and V3 inputted from the respective A/D converters 21, 22, and 23, and outputs the bit information signals B1 to B6 as determination results. It is to be noted that the decoding processor 25 makes the bit information determination by determining that the input terminal voltages V1 to V6 substantially coincide with respective terminal voltage values shown in FIGS. 7 and 8 if the input terminal voltages V1 to V6 are within a range, for example, between −10% and +10% of the terminal voltage values (this range is an error range that is decided according to the difference in the signal voltage level between the differential drivers 11 and 12 and the differential driver 13).

As stated so far, according to the present embodiment, if the output signals and the inverted output signals are transmitted by causing the differential drivers 11, 12, and 13 to superimpose the output signals and the inverted output signals on the three signal lines 31, 32, and 33, the terminal voltages V1, V2, and V3 induced across the terminating resistances 41, 42, and 43 connected to the adjacent signal lines differ from one another with depending on $2^6$ states of the bit information signals of six bits. In addition, the original bit information signals B1 to B6 can be decoded based on the terminal voltages V1, V2, and V3 detected by the respective A/D converters 21, 22, and 23 from the combinations of the terminal voltage values. Moreover, the voltages applied to the respective signal lines 31, 32, and 33 of the signal transmission path 30 amount to zero as a whole whichever bit information is transmitted, and noises radiated from the signal lines 31, 32, and 33 cancel one another. Therefore, less-noise transmission can be realized in a manner similar to that of the ordinary differential transmission method.

In the first embodiment, the differential drivers 11 and 12 may output the output signals of bipolar four values substantially equal in the signal voltage levels between the differential drivers 11 and 12 and their inverted output signals, whereas the differential driver 13 may output the output signals of bipolar four values different in the signal voltage levels from those of the signals outputted from the differential drivers 11 and 12 and their inverted output signals. Preferably, the differential driver 13 outputs the output signals of bipolar four values having higher signal voltage levels than those of the signals outputted from the differential drivers 11 and 12 and their inverted output signals.

In the first embodiment, the signal voltage levels of the differential drivers are set as follows:

(1) the signal voltage level of each of the differential drivers 11, 12, 13, and 14 is set to one of ±1, and ±2; and (2) the signal voltage level of each of the differential drivers 15 and 16 is set to one of ±1.1, and ±2.2.

Alternatively, the signal voltage levels of the differential drivers may be set as follows:

(1) the signal voltage level of each of the differential drivers 11, 12, 13, and 14 may be set to one of ±1, and ±3; and (2) the signal voltage level of each of the differential drivers 15 and 16 may be set to one of ±1.1, ±3.3.

In another alternative, the signal voltage levels of the differential drivers may be set as follows:

(1) the signal voltage level of each of the differential drivers 11, 12, 13, and 14 may be set to one of ±2, and ±3.; and (2) the signal voltage level of each of the differential drivers 15 and 16 may be set to one of ±2.2, ±3.3.

Second Embodiment

Figure 9:
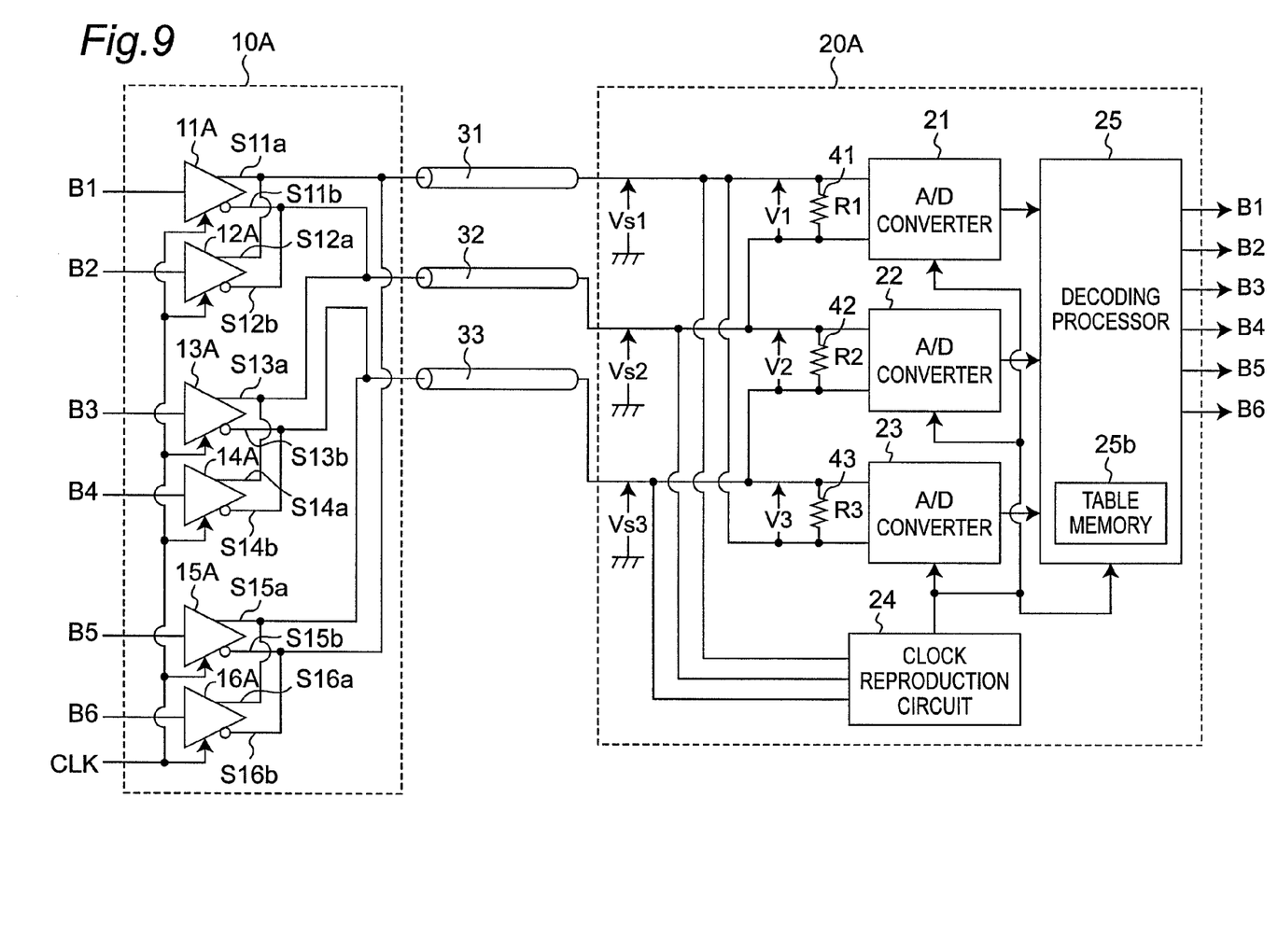
FIG. 9 is a block diagram showing a configuration of a multiple differential transmission system according to a second embodiment of the present invention.

FIG. 9 is a block diagram showing a configuration of a multiple differential transmission system according to a second embodiment of the present invention. The multiple differential transmission system according to the second embodiment differs from that according to the first embodiment in the following respects:

(1) The multiple differential transmission system includes a signal receiver 10A that includes six differential drivers 11A, 12A, 13A, 14A, 15A, and 16A each outputting a pair of an output signal and an inverted output signal, in response to a bit information signal of one bit in place of the signal receivers 10A that includes the three differential drivers 11, 12, and 13 each outputting a pair of an output signal and an inverted output signal, in response to bit information signals of two bits.

(2) The multiple differential transmission system includes a signal receiver 20A in place of the signal receiver 20, and the signal receiver 20A includes a decoding processor 25 that includes a table memory 25b having a different table from that of the table memory 25a.

The differences will be described in detail.

Figure 10:
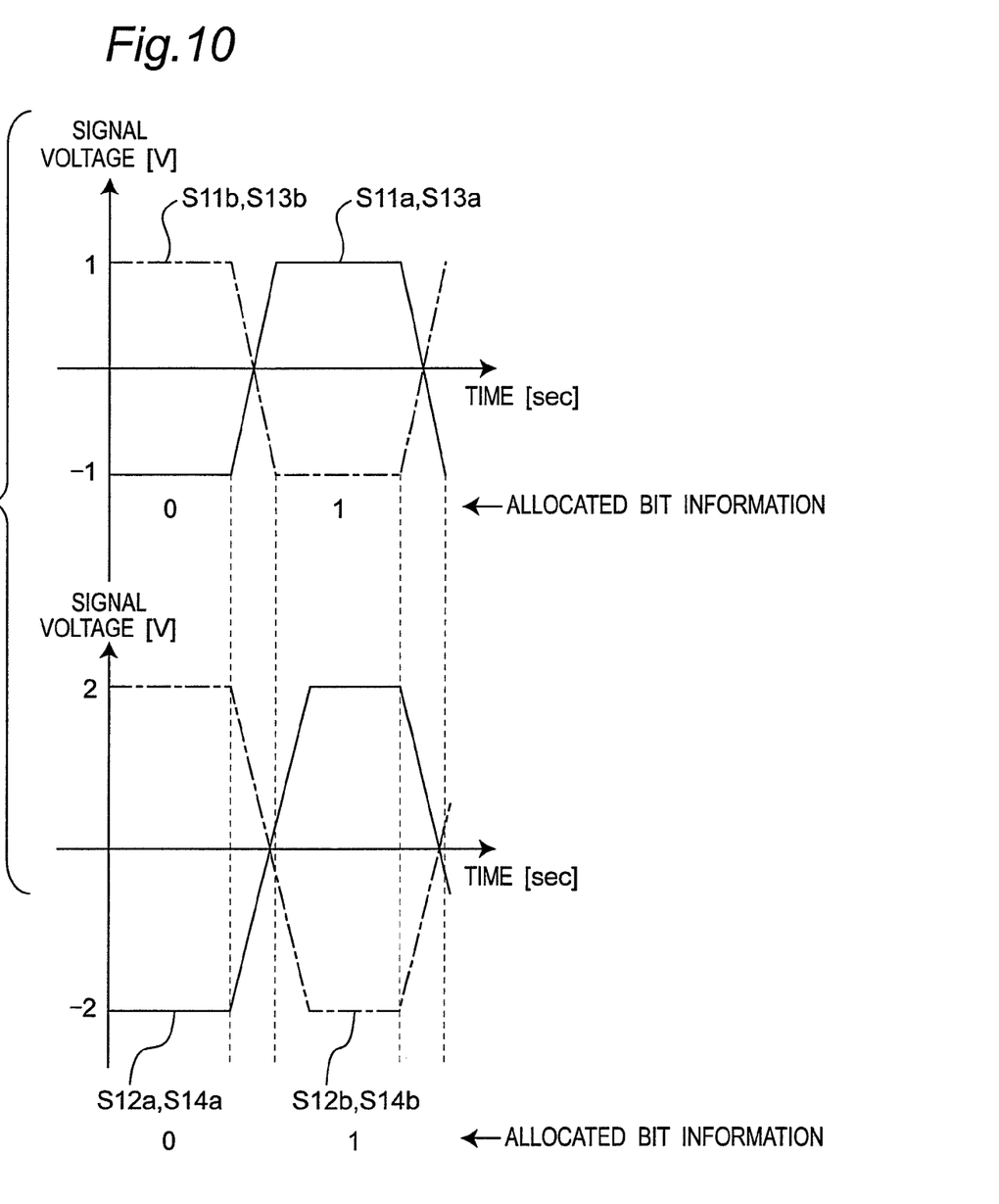
FIG. 10 is a waveform view showing a relationship between signal waveforms of output signals S11$a$ and S11$b$, S12$a$ and S12$b$, S13$a$ and S13$b$, and S14$a$ and S14$b$ from differential drivers 11A, 12A, 13A, and 14A shown in FIG. 9, respectively, and allocated bit information.
Figure 11:
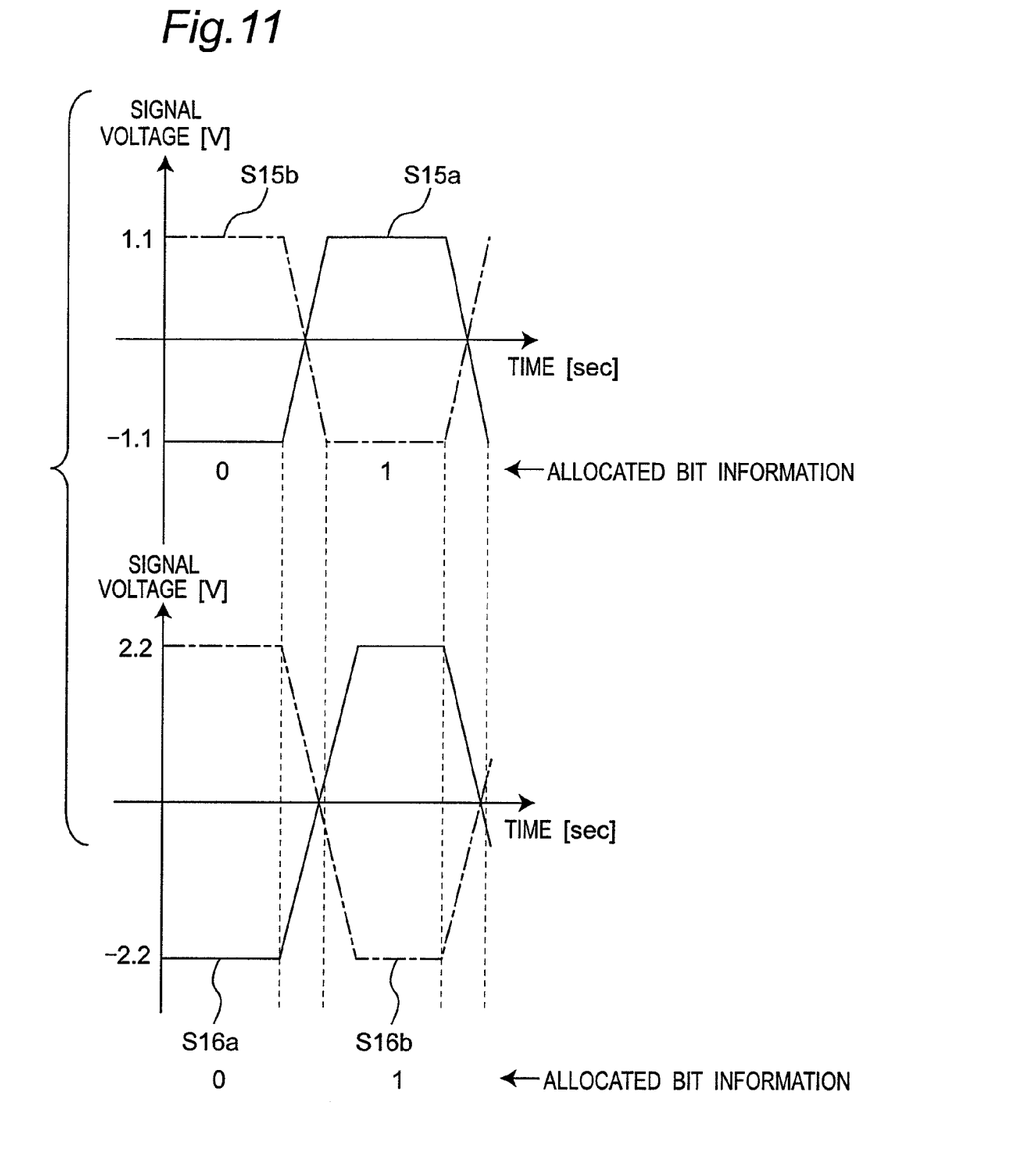
FIG. 11 is a waveform view showing a relationship between signal waveforms of output signals S15$a$ and S15$b$ and S16$a$ and S16$b$ from differential drivers 15A and 16A shown in FIG. 9, respectively, and allocated bit information.

FIG. 10 is a waveform view showing a relationship between signal waveforms of output signals S11a and S11b, S12a and S12b, S13a and S13b, and S14a and S14b from differential drivers 11A, 12A, 13A, and 14A shown in FIG. 9, respectively, and allocated bit information. FIG. 11 is a waveform view showing a relationship between signal waveforms of output signals S15a and S15b and S16a and S16b from differential drivers 15A and 16A shown in FIG. 9, respectively, and allocated bit information.

In the signal transmitter 10A shown in FIG. 9, (1) the differential driver 11A generates an output signal S11a of two bipolar values having a signal voltage level, e.g., ±1 V, and an inverted output signal S11b that is an inverted signal from the output signal S11a, in response to a bit information signal B1 of one bit;

(2) the differential driver 12A generates an output signal S12a of two bipolar values having a signal voltage level, e.g., ±2 V, twice as high as those of the output signal S11a from the differential driver 11A (e.g., a multiple of a natural number equal to or greater than 3), and an inverted output signal S12b that is an inverted signal from the output signal S12a, in response to a bit information signal B2 of one bit;

(3) the differential driver 13A generates an output signal S13a of two bipolar values having a signal voltage level, e.g., ±1 V, in a manner similar to that of the differential driver 11A, and an inverted output signal S13b that is an inverted signal from the output signal S13a, in response to a bit information signal B3 of one bit, (4) the differential driver 14A generates an output signal S14a of two bipolar values having a signal voltage level, e.g., ±2 V, in a manner similar to that of the differential driver 12A, and an inverted output signal S14b that is an inverted signal from the output signal S14a, in response to a bit information signal B4 of one bit;

(5) the differential driver 15A generates an output signal S15a of two bipolar values having a signal voltage level, e.g., ±1.1 V, slightly different from those of the output signal S11a from the differential driver 11A, and an inverted output signal S15b that is an inverted signal from the output signal S15a, in response to a bit information signal B5 of one bit; and (6) the differential driver 16A generates an output signal S16a of two bipolar values having a signal voltage level, e.g., ±2.2 V, slightly different from those of the output signal S12a from the differential driver 12A, and an inverted output signal S16b that is an inverted signal from the output signal S16a, in response to a bit information signal B6 of one bit.

Referring to FIG. 9, the output signal S11a, the output signal S12a, the inverted output signal S15b, and the inverted output signal S16b are combined and then transmitted to the signal line 31, the inverted output signal S11b, the inverted output signal S12b, the output signal S13a, and the output signal S14a are combined and then transmitted to the signal line 32, and the inverted output signal S13b, the inverted output signal S14b, the output signal S15a, and the output signal S16a are combined and then transmitted to the signal line 33.

Figure 12:
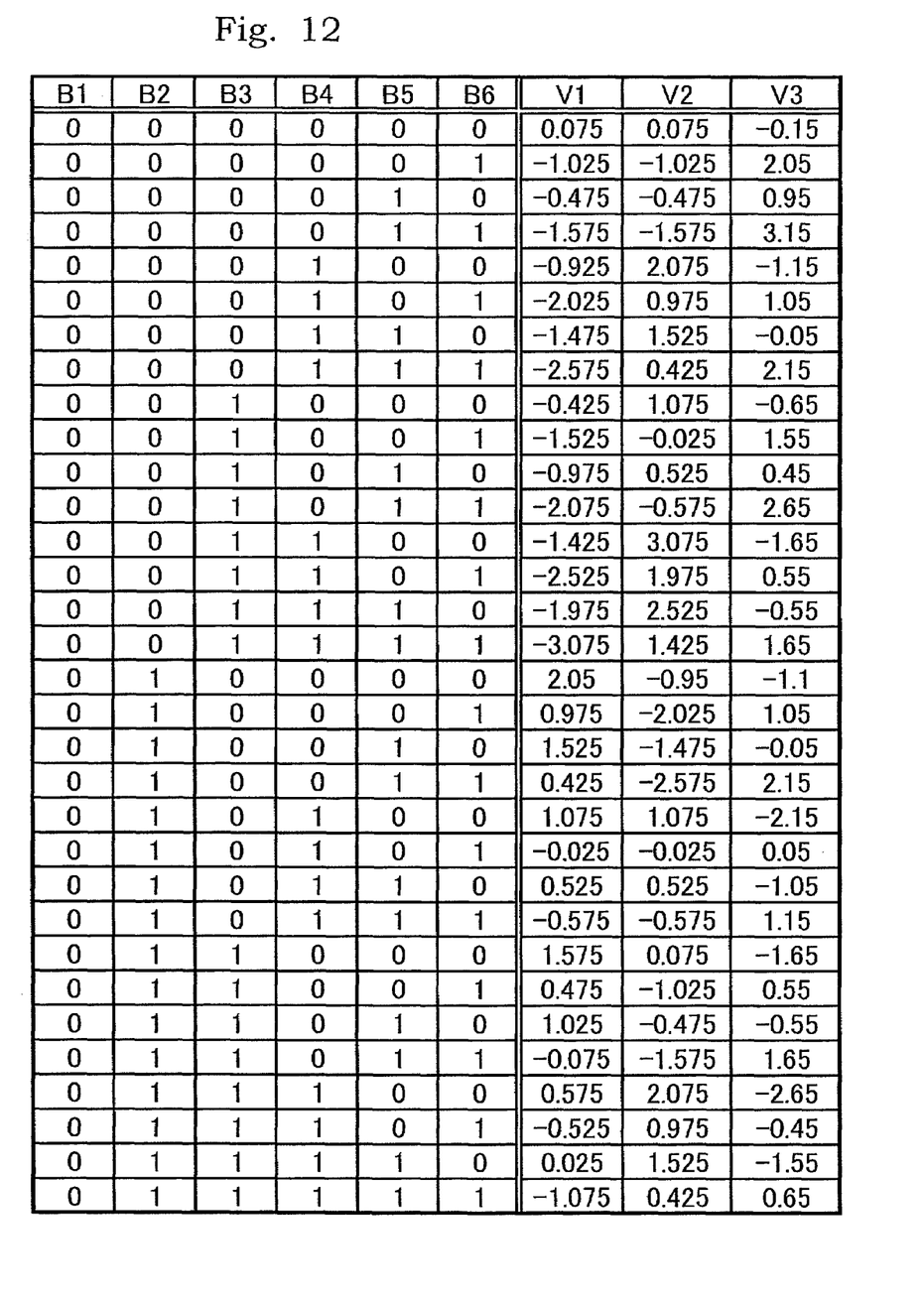
FIG. 12 is a diagram showing a first part of the relationship between the bit information signals B1 to B6 transmitted in the multiple differential transmission system shown in FIG. 9 and the terminal voltages V1, V2, and V3 induced by respective terminating resistances 41, 42, and 43 of a signal receiver 20A.
Figure 13:
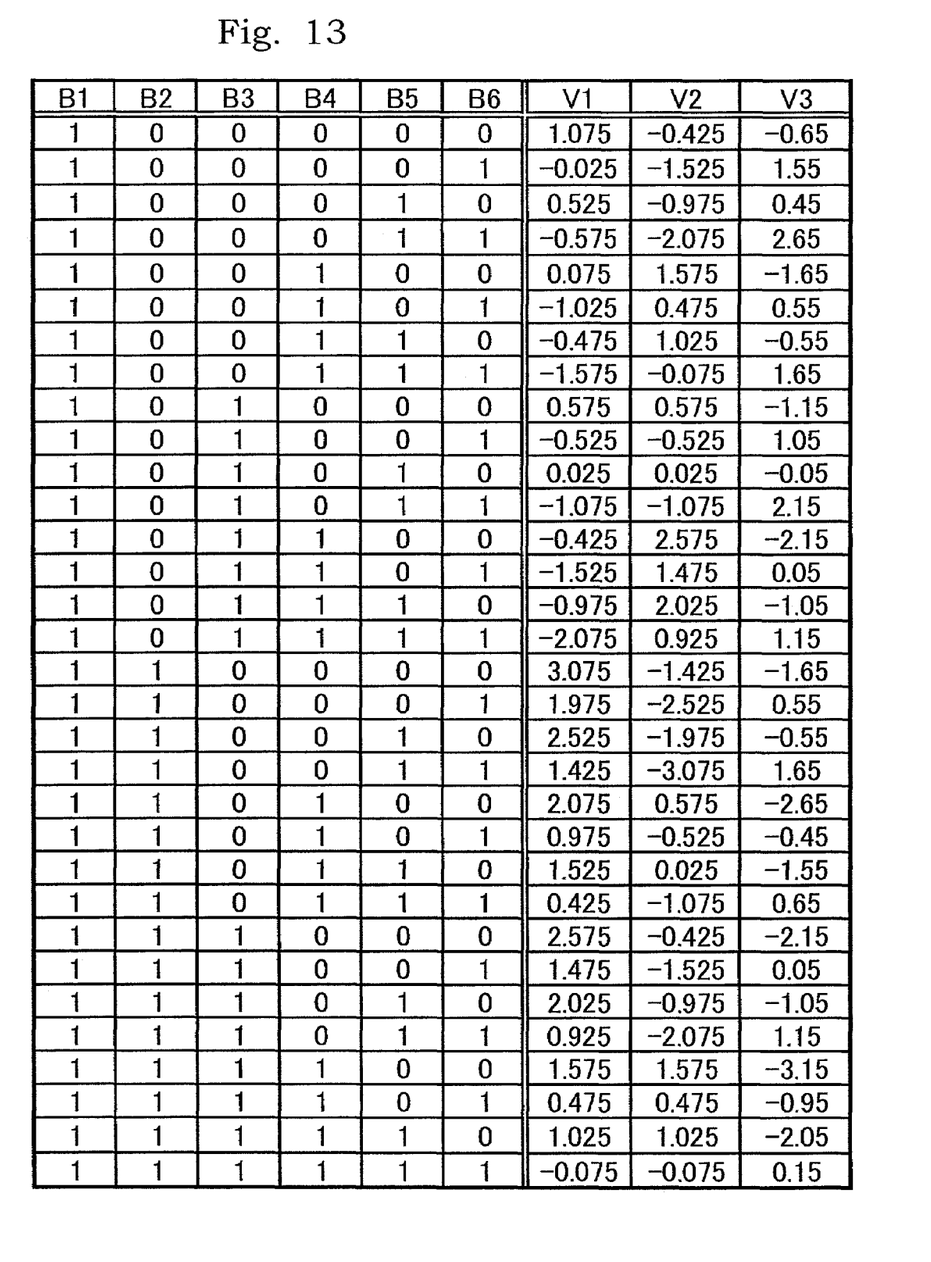
FIG. 13 is a diagram showing a second part of the relationship between the bit information signals B1 to B6 transmitted in the multiple differential transmission system shown in FIG. 9 and the terminal voltages V1, V2, and V3 induced by the respective terminating resistances 41, 42, and 43 of the signal receiver 20A.

FIGS. 12 and 13 are diagrams showing a relationship between the bit information signals B1 to B6 transmitted in the multiple differential transmission system shown in FIG. 9 and terminal voltages V1, V2, and V3 induced by respective terminating resistances 41, 42, and 43 of the signal receiver 20A.

The decoding processor 25 includes the table memory 25a for storing therein an information table shown in FIGS. 12 and 13 in advance. Referring to the table stored in the table memory 25b, the decoding processor 25 determines the bit information signals B1 to B6 of six bits based on the terminal voltages V1, V2, and V3 inputted from respective A/D converters 21, 22, and 23, and outputs the bit information signals Bi to B6 as determination results. It is to be noted that the decoding processor 25 makes the bit information determination by determining that the input terminal voltages V1 to V6 substantially coincide with respective terminal voltage values shown in FIGS. 12 and 13 if the input terminal voltages V1 to V6 are within a range, for example, between −10% and +10% of the terminal voltage values (this range is an error range that is decided according to the difference in the signal voltage level between the differential drivers 11 and 12 and the differential driver 13).

As mentioned above, according to the present embodiment, if the output signals and the inverted output signals are transmitted by causing the differential drivers 11A to 16A to superimpose the output signals and the inverted output signals on the three signal lines 31, 32, and 33, the terminal voltages V1, V2, and V3 induced across the terminating resistances 41, 42, and 43 connected to the adjacent signal lines differ from one another with depending on $2^6$ states of the bit information signals of six bits. Further, the original bit information signals B1 to B6 can be decoded based on the terminal voltages V1, V2, and V3 detected by the respective A/D converters 21, 22, and 23 from the combinations of the terminal voltage values. Moreover, the voltages applied to the respective signal lines 31, 32, and 33 of the signal transmission path 30 amount to zero as a whole whichever bit information is transmitted, and noises radiated from the signal lines 31, 32, and 33 cancel one another. Therefore, less-noise transmission can be realized in a manner similar to that of the ordinary differential transmission method.

In the second embodiment, the signal voltage levels of the differential drivers 11A to 16A are not limited to the above-stated values but may be set to satisfy the following requirements:

(1) The signal voltage levels of the differential drivers 12A and 14A are set to be different by a predetermined first differential voltage ΔVd1 from those of the differential drivers 11A and 13A, respectively.

(2) The signal voltage levels of the differential driver 15A are set to be different by a predetermined second differential voltage ΔVd2 (where ΔVd2<ΔVd1) from those of the differential drivers 11A and 13A.

(3) The signal voltage levels of the differential driver 16A are set to be different by a predetermined third differential voltage ΔVd3 (where ΔVd2<ΔVd3<ΔVd1) from those of the differential drivers 12A and 14A.

Preferably, the signal voltage levels of the differential drivers 11A to 16A are set to satisfy the following requirements:

(1) The signal voltage levels of the differential drivers 12A and 14A are set to be higher by the predetermined first differential voltage ΔVd1 than those of the differential drivers 11A and 13A, respectively.

(2) The signal voltage levels of the differential driver 15A are set to be higher by the predetermined second differential voltage ΔVd2 (where ΔVd2<ΔVd1) than those of the differential drivers 11A and 13A.

(3) The signal voltage levels of the differential driver 16A are set to be higher by the predetermined third differential voltage ΔVd3 (where ΔVd2<ΔVd3<ΔVd1) than those of the differential drivers 12A and 14A.

In the second embodiment, the signal voltage levels of the differential drivers 11A to 16A are set as follows:

(1) the signal voltage level of each of the differential drivers 11A and 13A is set to one of ±1;

(2) the signal voltage level of each of the differential drivers 12A and 14A is set to one of ±2;

(3) the signal voltage level of the differential driver 15A is set to one of ±1.1; and (4) the signal voltage level of the differential driver 16A is set to one of ±2.2.

Alternatively, the signal voltage levels of the differential drivers 11A to 16A may be set as follows:

(1) the signal voltage level of each of the differential drivers 11A and 13A is set to one of ±1;

(2) the signal voltage level of each of the differential drivers 12A and 14A is set to one of ±3;

(3) the signal voltage level of the differential driver 15A is set to one of ±1.1; and (4) the signal voltage level of the differential driver 16A is set to one of ±3.3.

In another alternative, the signal voltage levels of the differential drivers 11A to 16A may be set as follows:

(1) the signal voltage level of each of the differential drivers 11A and 13A is set to one of ±2;

(2) the signal voltage level of each of the differential drivers 12A and 14A is set to one of ±3;

(3) the signal voltage level of the differential driver 15A is set to one of ±2.2; and (4) the signal voltage level of the differential driver 16A is set to one of ±3.3.

INDUSTRIAL APPLICABILITY

As mentioned above in detail, the multiple differential transmission system according to the present invention can differentially transmit bit information signals of six bits using three signal lines, and differentially transmit bit information signals of multiple bits using wirings fewer than those used in the prior arts with suppressing an increase of noise. The multiple differential transmission system according to the present invention is applicable particularly for transmission of multiple-bit data for a display intended to realize a higher image quality than those according to the prior arts or as a high-rate transmission system for an apparatus necessary to downsize.

The invention claimed is:

1. A signal transmitter for use in a multiple differential transmission system comprising the signal transmitter, a signal receiver, and a signal transmission path including first, second, and third signal lines, the signal transmission path connecting the signal transmitter to the signal receiver, the signal transmitter comprising:

a first differential driver for generating a first output signal of bipolar four values including bipolar two values having a predetermined first signal voltage level and another bipolar two values having a predetermined second voltage level, and an inverted first output signal that is a phase-inverted signal from the first output signal, in response to a first bit information signal of two bits;

a second differential driver for generating a second output signal of bipolar four values including bipolar two values having the first signal voltage level and another bipolar two values having the second voltage level, and an inverted second output signal that is a phase-inverted signal from the second output signal, in response to a second bit information signal of two bits; and a third differential driver for generating a third output signal of bipolar four values including bipolar two values having a predetermined third signal voltage level different from the first signal voltage level and another bipolar two values having a predetermined fourth voltage level different from the second signal voltage level, and an inverted third output signal that is a phase-inverted signal from the third output signal, in response to a third bit information signal of two bits, wherein the first output signal and the inverted third output signal are combined and transmitted to the first signal line, wherein the second output signal and the inverted first output signal are combined and transmitted to the second signal line, and wherein the third output signal and the inverted second output signal are combined and transmitted to the third signal line.

2. A signal receiver for receiving three output signals from the signal transmitter as claimed in claim 1 via a signal transmission path including first, second, and third signal lines, the signal receiver comprising:

a first terminating resistance connected between the first signal line and the second signal line;

a second terminating resistance connected between the second signal line and the third signal line;

a third terminating resistance connected between the third signal line and the first signal line; and a decoding processor for decoding the first, second, and third bit information signals, and outputting the decoded first, second, and third bit information signals based on a first terminal voltage induced by the first terminating resistance, a second terminal voltage induced by the second terminating resistance, and a third terminal voltage induced by the third terminating resistance.

3. A multiple differential transmission system for use in a multiple differential transmission system comprising the signal transmitter, a signal receiver, and a signal transmission path including first, second, and third signal lines, the signal transmission path connecting the signal transmitter to the signal receiver, wherein the signal transmitter comprises:

a first differential driver for generating a first output signal of bipolar four values including bipolar two values having a predetermined first signal voltage level and another bipolar two values having a predetermined second voltage level, and an inverted first output signal that is a phase-inverted signal from the first output signal, in response to a first bit information signal of two bits;

a second differential driver for generating a second output signal of bipolar four values including bipolar two values having the first signal voltage level and another bipolar two values having the second voltage level, and an inverted second output signal that is a phase-inverted signal from the second output signal, in response to a second bit information signal of two bits; and a third differential driver for generating a third output signal of bipolar four values including bipolar two values having a predetermined third signal voltage level different from the first signal voltage level and another bipolar two values having a predetermined fourth voltage level different from the second signal voltage level, and an inverted third output signal that is a phase-inverted signal from the third output signal, in response to a third bit information signal of two bits, wherein the first output signal and the inverted third output signal are combined and transmitted to the first signal line, wherein the second output signal and the inverted first output signal are combined and transmitted to the second signal line, and wherein the third output signal and the inverted second output signal are combined and transmitted to the third signal line, wherein the signal receiver comprises:

a first terminating resistance connected between the first signal line and the second signal line;

a second terminating resistance connected between the second signal line and the third signal line;

a third terminating resistance connected between the third signal line and the first signal line; and a decoding processor for decoding the first, second, and third bit information signals, and outputting the decoded first, second, and third bit information signals based on a first terminal voltage induced by the first terminating resistance, a second terminal voltage induced by the second terminating resistance, and a third terminal voltage induced by the third terminating resistance.

4. A signal transmitter for use in a multiple differential transmission system including the signal transmitter, a signal receiver, and a signal transmission path including first, second, and third signal lines, the signal transmission path connecting the signal transmitter to the signal receiver, the signal transmitter comprising:

a first differential driver for generating a first output signal of two bipolar values having a predetermined first signal voltage level, and an inverted first output signal that is a phase-inverted signal from the first output signal, in response to a first bit information signal of one bit;

a second differential driver for generating a second output signal of two bipolar values having a predetermined second signal voltage level different from the first signal voltage level by a first differential voltage, and an inverted second output signal that is an inverted signal from the second output signal, in response to a second bit information signal of one bit;

a third differential driver for generating a third output signal of two bipolar values having the first signal voltage level, and an inverted third output signal that is a phase-inverted signal from the third output signal, in response to a third bit information signal of one bit, a fourth differential driver for generating a fourth output signal of two bipolar values having the second signal voltage level, and an inverted fourth output signal that is a phase-inverted signal from the fourth output signal, in response to a fourth bit information signal of one bit;

a fifth differential driver for generating a fifth output signal of two bipolar values having a predetermined third signal voltage level different from the first signal voltage levels by a second differential voltage lower than the first differential voltage, and an inverted fifth output signal that is a phase-inverted signal from the fifth output signal, in response to a fifth bit information signal of one bit; and a sixth differential driver for generating a sixth output signal of two bipolar values having a predetermined fourth signal voltage level different from the second signal voltage levels by a third differential voltage lower than the first differentia voltage and higher than the second differential voltage, and an inverted sixth output signal that is a phase-inverted signal from the sixth output signal, in response to a sixth bit information signal of one bit, wherein the first output signal, the second output signal, the inverted fifth output signal, and the inverted sixth output signal are combined and transmitted to the first signal line, wherein the inverted first output signal, the inverted second output signal, the third output signal, and the fourth output signal are combined and transmitted to the second signal line, and wherein the inverted third output signal, the inverted fourth output signal, the fifth output signal, and the sixth output signal are combined and transmitted to the third signal line.

5. A signal receiver for receiving three output signals from the signal transmitter as claimed in claim 4, via a signal transmission path including first, second, and third signal lines, the signal receiver comprising:

a first terminating resistance connected between the first signal line and the second signal line;

a second terminating resistance connected between the second signal line and the third signal line;

a third terminating resistance connected between the third signal line and the first signal line; and a decoding processor for decoding the first to sixth bit information signals and outputting the decoded first to sixth bit information signals based on a first terminal voltage induced by the first terminating resistance, a second terminal voltage induced by the second terminating resistance, and a third terminal voltage induced by the third terminating resistance.

6. A multiple differential transmission system including the signal transmitter, a signal receiver, and a signal transmission path including first, second, and third signal lines, the signal transmission path connecting the signal transmitter to the signal receiver, wherein the signal transmitter comprises:

a first differential driver for generating a first output signal of two bipolar values having a predetermined first signal voltage level, and an inverted first output signal that is a phase-inverted signal from the first output signal, in response to a first bit information signal of one bit;

a second differential driver for generating a second output signal of two bipolar values having a predetermined second signal voltage level different from the first signal voltage level by a first differential voltage, and an inverted second output signal that is an inverted signal from the second output signal, in response to a second bit information signal of one bit;

a third differential driver for generating a third output signal of two bipolar values having the first signal voltage level, and an inverted third output signal that is a phase-inverted signal from the third output signal, in response to a third bit information signal of one bit, a fourth differential driver for generating a fourth output signal of two bipolar values having the second signal voltage level, and an inverted fourth output signal that is a phase-inverted signal from the fourth output signal, in response to a fourth bit information signal of one bit;

a fifth differential driver for generating a fifth output signal of two bipolar values having a predetermined third signal voltage level different from the first signal voltage levels by a second differential voltage lower than the first differential voltage, and an inverted fifth output signal that is a phase-inverted signal from the fifth output signal, in response to a fifth bit information signal of one bit; and a sixth differential driver for generating a sixth output signal of two bipolar values having a predetermined fourth signal voltage level different from the second signal voltage levels by a third differential voltage lower than the first differentia voltage and higher than the second differential voltage, and an inverted sixth output signal that is a phase-inverted signal from the sixth output signal, in response to a sixth bit information signal of one bit, wherein the first output signal, the second output signal, the inverted fifth output signal, and the inverted sixth output signal are combined and transmitted to the first signal line, wherein the inverted first output signal, the inverted second output signal, the third output signal, and the fourth output signal are combined and transmitted to the second signal line, and wherein the inverted third output signal, the inverted fourth output signal, the fifth output signal, and the sixth output signal are combined and transmitted to the third signal line, wherein the signal receiver comprises:

a first terminating resistance connected between the first signal line and the second signal line;

a second terminating resistance connected between the second signal line and the third signal line;

a third terminating resistance connected between the third signal line and the first signal line; and a decoding processor for decoding the first to sixth bit information signals and outputting the decoded first to sixth bit information signals based on a first terminal voltage induced by the first terminating resistance, a second terminal voltage induced by the second terminating resistance, and a third terminal voltage induced by the third terminating resistance.

* * * * *